March 5, 1946. H. E. GOLDSTINE 2,396,096

ULTRA-SHORT WAVE COMMUNICATION SYSTEM

Filed Nov. 5, 1942

INVENTOR
HALLAN E. GOLDSTINE.
BY H.S.Grover
ATTORNEY

Patented Mar. 5, 1946

2,396,096

UNITED STATES PATENT OFFICE 2,396,096

ULTRA SHORT WAVE COMMUNICATION SYSTEM

Hallan E. Goldstine, Port Jefferson, N. Y., assignor to Radio Corporation of America, a corporation of Delaware Application November 5, 1942, Serial No. 464,611

6 Claims. (Cl. 250—6)

This invention relates to radio communication systems, and particularly to such systems employing ultra short waves of quasi-optical character for communicating over short distances between stations within the line of sight of each other. The invention is particularly useful when the transmitting and receiving stations are located within ten miles or so, from one another, and employ waves of a length below one meter for communication purposes.

It has been found that when radio communication is attempted between two stations located within line of sight of each other over ultra short waves of the order of one meter and less, that unavoidable reflections occur which produce distortions in the received wave. These reflections may be caused by buildings in the surrounding area or by the topography of the terrain. The received signal will vary with the height of the transmitting and receiving antennas as the main wave and the reflected wave combine. When these two waves arrive at the receiving station 180° out-of-phase, a minimum signal is received, and when the two waves arrive in phase the signal will be a maximum. At very high frequencies, for example at 3000 megacycles, these maxima and minima will vary rapidly with height if the distance between transmitting and receiving stations is several miles. It has been found that climatic conditions, such as temperature changes, will cause differences in the path length, due to refraction or temperature inversion phenomena.

According to the present invention, it is proposed to eliminate this distortion by erecting a barrier to prevent a large part of the reflected wave from being received. In this way, the magnitude of the reflected wave will then be smaller than the main transmitted wave, and thus the variations in the path length due to climatic or other conditions will have a minimum effect upon the received signal.

Figure 1:
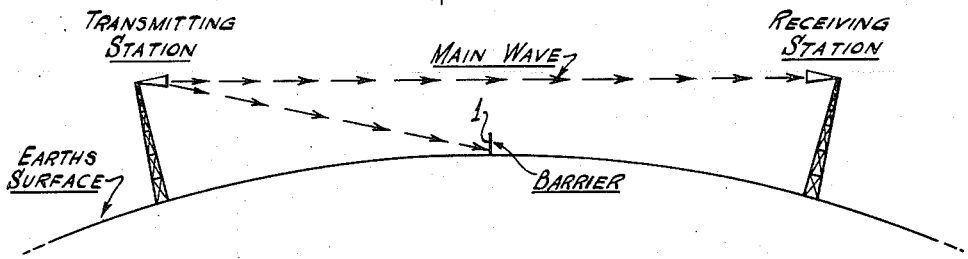
Figure 2:
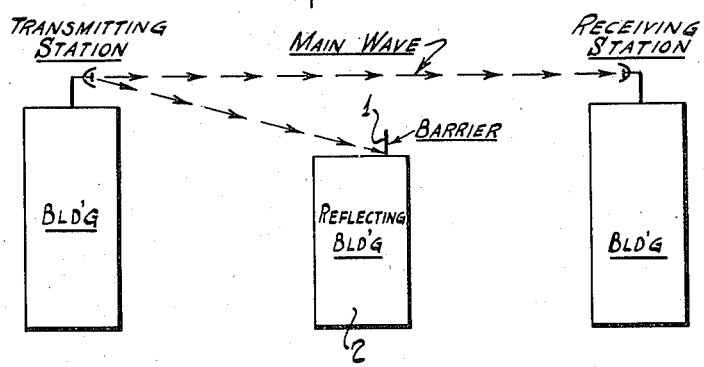
Figure 3:
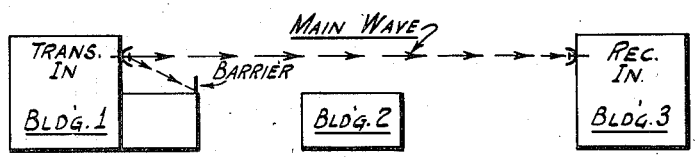

A better understanding of the invention may be had by referring to the following description, which is accompanied by a drawing wherein Figs. 1, 2 and 3 show three different embodiments of the invention.

Referring to Fig. 1 in more detail, there is shown a radio communication system comprising transmitting and receiving stations spaced several miles apart from each other. Both of these stations are shown diagrammatically only, as including an electromagnetic wave directive structure such as a horn mounted on a mast located above the ground. The direction of the main wave is shown by arrows suitably labeled. To prevent the waves emanating from the transmitting station and reflected from a wave reflecting surface, such as the ground, from reaching the receiving station, there is provided a barrier 1. This barrier may be of conducting material, such as a sheet of metal, or of a dielectric absorbing material, to eliminate a large part of the reflected wave from being received by the receiving station. In Fig. 1, it is assumed that the wave reflecting surface is the surface of the earth. By way of illustration, the system of Fig. 1 may use ultra high frequencies of the order of 3000 megacycles and the transmitting and receiving station spaced apart from each other by a distance of ten miles. This distance, of course, is within the line of sight of the two stations. These figures are given by way of example only, and are not limitative of the invention.

Fig. 2 shows the principles of the invention applied in a city where there are numerous buildings. In such a congested area, it is often desired to use link circuits between traffic offices, such as between a transmitter on the RCA Building and a receiver on the Empire State Building. Both of these buildings are in New York, New York, and have a radio link between them.

The transmitting and receiving stations are appropriately labeled as such and are shown as including parabolic antennas located on the top of these buildings. These antennas are pointed toward each other for most effective communication. To prevent reflection from the top of a building, such as 2, positioned in an area substantially intermediate the transmitting and receiving stations, there is provded a barrier 1 on the top of bulding 2 to intercept the waves from the transmitting station which would normally be reflected by building 2 toward the receiving station. Due to the two-dimensional character of the drawing, the reflecting building 2 is shown as being between the transmitting and receiving stations, although it should be understood that the reflecting building may be located to one side of the transmitting and receiving stations.

Fig. 3 shows a plan view of the system of the invention which may be applied to buildings in a city. The transmitter is located on building 1, the receiver on building 3, the wave reflecting surface may be building 2 or the ground. To prevent waves emanating from the transmitting station from striking the wave reflecting surface (here indicated as building 2) and then being received by the receiver on building 3, there is provided a barrier 1 which is located on a portion of the building 1 which may be an offset on this building. It will thus be evident that the barrier 1 need not be located on the wave reflecting surface but can be located on the building accommodating the transmitting station, or at any suitable location to intercept waves which would normally be reflected from a reflecting surface. Here again, the barrier 1 may be a conducting sheet of material or a dielectric absorbing material.

In practice, when using the principles of the invention in a city, as illustrated in Figs. 2 and 3, the barrier 1 may comprise a suitable sign containing advertising matter. The system of the invention may use any ultra short waves in a quasi-optical range and by way of illustration such waves may be of the order of three or five meters, at which television signals can be transmitted. The transmitting and receiving stations in Figs. 2 and 3 are, of course, located within line of sight of one another.

What is claimed is:

1. In a radio communication system employing ultra short waves of quasi-optical character between fixed transmitting and receiving stations spaced apart within line of sight of each other, said stations having directive antennas positioned to be most effective with each other, a wave reflecting surface which reflects waves radiated by said transmitting station toward said receiving station, and a wave impermeable barrier positioned at a predetermined location relative to said wave reflecting surface to intercept the waves radiated from said transmitting station toward said surface to thereby prevent them from being received by said receiving station.

2. In an electromagetic wave communication system employing waves below one meter, a fixed transmitting station having a directive electromagnetic wave radiating structure, a fixed receiving station spaced several miles from said transmitting station and provided with a directive electromagnetic wave collecting structure pointed toward the transmitting station, a wave reflecting surface positioned substantially intermediate said two stations, and a wave impermeable barrier positioned on said surface and having such dimensions as to prevent the waves radiated by said transmitting station from being reflected by said surface and received by said receiving station.

3. In a radio communication system employing ultra short waves of quasi-optical character between fixed transmitting and receiving stations spaced apart within line of sight of each other, said transmitting and receiving stations having directive electromagnetic wave radiating and collecting structures, respectively, positioned to be most effective with each other, a wave reflecting surface which reflects waves radiated by said transmitting station toward said receiving station, and a sheet metal barrier positioned on said surface to intercept the waves radiated from said transmitting station toward said surface to thereby prevent them from interfering with the main signal wave arriving at said receiving station.

4. In a radio communication system employing ultra high frequencies of the order of 3000 megacycles between fixed transmitting and receiving stations spaced apart from each other by a distance not exceeding ten miles, said stations having directive horn structures positioned to be most effective with each other for communication purposes, a wave reflecting surface which reflects waves radiated by said transmitting station toward said receiving station, and a wave impermeable barrier positioned at a predetermined location relative to said wave reflecting surface to intercept the waves radiated from said transmitting station toward said surface to thereby prevent them from being received by said receiving station.

5. In a radio communication system employing ultra short waves of quasi-optical character between fixed transmitting and receiving directive electromagnetic wave radiating and collecting structures located on buildings within line of sight of each other, there being a building located in the area generally intermediate said transmitting and receiving radiating and collecting structures and which provides a surface for reflecting waves radiated by said transmitting wave directive structure toward said receiving wave directive structure, and a wave impermeable barrier positioned on said last building to intercept the waves radiated from said transmitting structure and which would normally be reflected toward said receiving structure in the absence of said barrier.

6. In a radio communication system employing ultra short waves of quasi-optical character between fixed transmitting and receiving directive electromagnetic wave radiating and collecting structures located on buildings within line of sight of each other, there being a building located in the area generally intermediate said transmitting and receiving radiating and collecting structures and which provides a surface for reflecting waves radiated by said transmitting wave directive structure toward said receiving wave directive structure, and a wave impermeable barrier positioned on the building on which said transmitting structure is mounted, said barrier being arranged to intercept waves radiated toward said wave reflecting surface.

HALLAN E. GOLDSTINE.